US011796418B2

(12) United States Patent
Mohamed et al.

(10) Patent No.: US 11,796,418 B2
(45) Date of Patent: Oct. 24, 2023

(54) CONTACT LENS DEFECT ANALYSIS AND TRACING SYSTEM

(71) Applicant: EMAGE VISION PTE. LTD., Singapore (SG)

(72) Inventors: Ya'akob Bin Mohamed, Singapore (SG); Bee Chuan Tan, Singapore (SG)

(73) Assignee: EMAGE VISION PTE. LTD., Singapore (SG)

( * ) Notice: Subject to any disclaimer, the term of this patent is extended or adjusted under 35 U.S.C. 154(b) by 78 days.

(21) Appl. No.: 17/501,368

(22) Filed: Oct. 14, 2021

(65) Prior Publication Data

US 2022/0178787 A1 Jun. 9, 2022

(30) Foreign Application Priority Data

Oct. 14, 2020 (SG) .............................. 10202010191P

(51) Int. Cl.
*G01M 11/02* (2006.01)
*G01N 21/958* (2006.01)
*G06T 7/00* (2017.01)

(52) U.S. Cl.
CPC .... *G01M 11/0278* (2013.01); *G01M 11/0257* (2013.01); *G01N 21/958* (2013.01); *G06T 7/0004* (2013.01); *G01N 2021/9583* (2013.01)

(58) Field of Classification Search
CPC ......... G01M 11/0278; G01M 11/0257; G01M 11/0264; G01N 21/958; G01N 2021/9583;

(Continued)

(56) References Cited

U.S. PATENT DOCUMENTS 5,973,772 A * 10/1999 Fukuma ............... G02C 13/005
356/124
9,970,884 B1 * 5/2018 Nikitin ................. H04N 17/002
(Continued)

*Primary Examiner* — Isiaka O Akanbi
(74) *Attorney, Agent, or Firm* — Thomas | Horstemeyer, LLP

(57) ABSTRACT

A manual inspection system and method to inspect for defects in Contact lenses comprising; an image acquisition system with at least two high resolution cameras; Top illumination light head used for acquiring Bright field images; a Backlit illumination module to acquire Dark field images; at least another back lit illumination module to acquire a different type of Bright field images; an interchangeable mechanism to change measurement gauges suitable for a particular product; a rotating wheel embedded with multiple optical filters to cater to different imaging requirements; a first camera to capture the full view of the contact lens at a beam splitter; a second camera suitably mounted on a swivel arm to capture a higher resolution image of a selected defective area as viewed on a projection screen; a glass template or measurement gauge mounted at a suitable position to achieve overlaid images of the lens and the gauge on a projection screen for taking measurements; a flexible template measurement gauge as an optional overlay, to replace the glass template, suitably mounted on the projection screen for easy measurement of defects and geometry of the contact lens; an XYZ table to position the contact lens; creating a database on the computer that tabulates geometrical information and detailed defect information along with their respective positional information; and subsequently analyzing the database images to arrive at corrective actions to the manufacturing process to improve the quality and yields in the contact lens.

7 Claims, 4 Drawing Sheets

(58) Field of Classification Search
CPC ... G01N 2021/8825; G01N 2021/8854; G01N 2021/8887; G01N 21/8806; G01N 21/8851; G01N 2201/104; G06T 7/0004; G06T 2207/10056; G06T 2207/10024; G06T 2207/10052; G06V 2201/06; G06V 10/12; G06F 18/241
USPC .................. 356/237.1–237.6, 124–127, 138
See application file for complete search history.

(56) References Cited

U.S. PATENT DOCUMENTS

| | | | |
|---|---|---|---|
| 10,976,217 B2* | 4/2021 | Smorgon | G01M 11/0235 |
| 2009/0208072 A1* | 8/2009 | Seibel | G01N 21/4795 |
| | | | 382/128 |
| 2014/0041184 A1* | 2/2014 | Schneider | B24B 9/14 |
| | | | 29/407.04 |
| 2016/0258880 A1* | 9/2016 | Smorgon | G01N 21/8806 |
| 2017/0011507 A1* | 1/2017 | Wong | G01M 11/0278 |
| 2017/0082522 A1* | 3/2017 | Tan | G01N 21/958 |
| 2017/0138867 A1* | 5/2017 | Smorgon | G01N 21/958 |
| 2017/0324895 A1* | 11/2017 | Bryll | H04N 23/62 |
| 2018/0232876 A1* | 8/2018 | Tan | G02C 7/04 |
| 2019/0323920 A1* | 10/2019 | Smorgon | G01M 11/0278 |

* cited by examiner

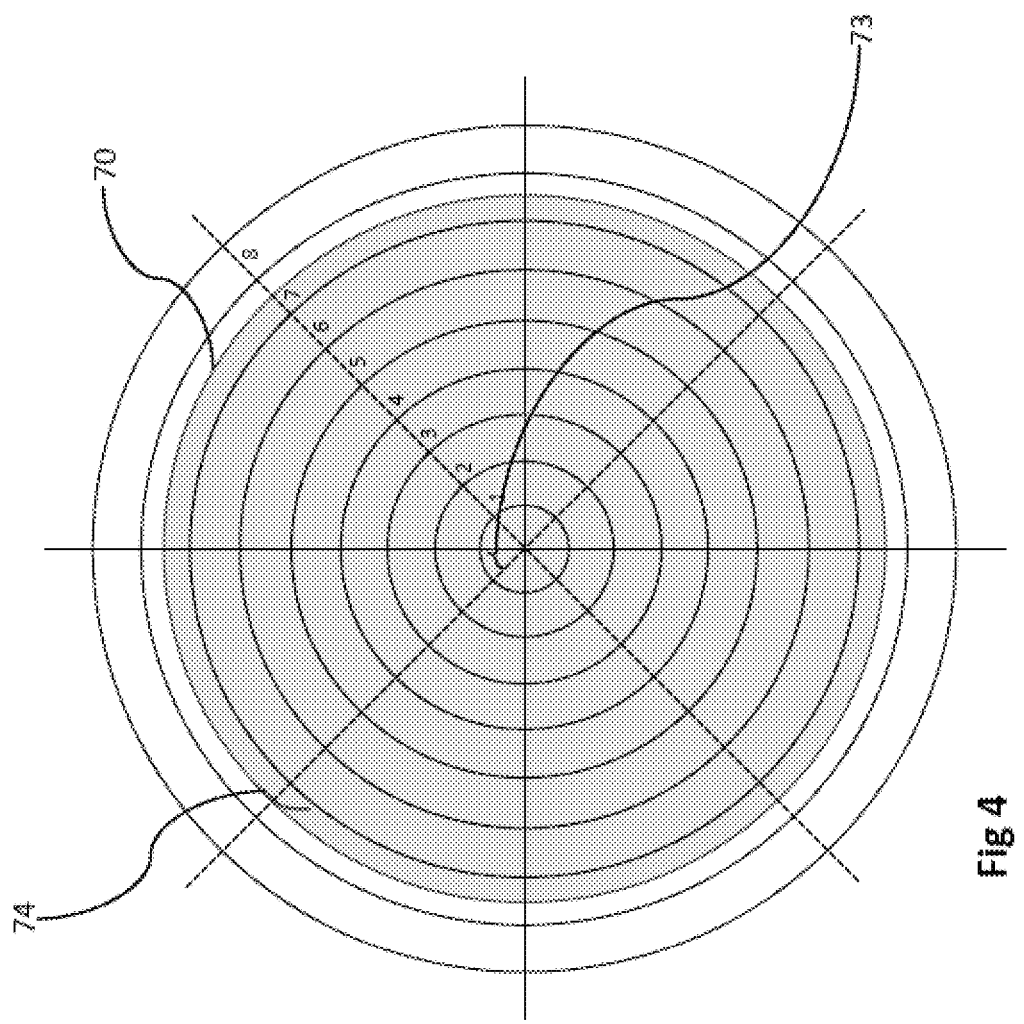

CONTACT LENS DEFECT ANALYSIS AND TRACING SYSTEM

CROSS-REFERENCE TO RELATED APPLICATIONS

This application claims priority to, and the benefit of, Singapore Patent Application SG 10202010191P, filed on Oct. 14, 2020, and entitled "CONTACT LENS DEFECT ANALYSIS AND TRACING SYSTEM," which is incorporated by reference as if set forth herein in its entirety.

FIELD OF THE INVENTION

The present invention relates to a system and method for identifying defects in contact lenses from a magnified image and subsequently storing specific defective areas in the image of the contact lens classified under a manufacturing Lot number for traceability and analysis purposes. More specifically, the present invention relates to a system to classify and tabulate the type of defect in the contact lens images such as scratches, bubbles and other manufacturing defects and variations related to the geometrical properties of contact lenses to enable process monitoring for improvement in the manufacturing quality.

BACKGROUND OF THE INVENTION

The present invention relates to an inspection system and method in the quality assurance process in a manual inspection process. More particularly, the invention relates to a system and method of inspection of contact lenses that require detailed inspection of suspect contact lenses by placing them in a contact lens holder and enabling the human operator to further select the area of interest where the defect is present for further analysis. In an automated inspection system, defective lenses are normally physically separated and placed into trays or other forms of transporting gadgets. The rejected contact lenses may have minor or major defects that needs to be analyzed. The analyzed results are shared with the manufacturing process operators who may use the data to fine tune or tweak the inspection parameters of the automated inspection system to improve the quality of inspection. Manufacturers generally adopt manual inspection by using magnified projection systems commonly known as optical inspection projector to enable the operator to identify defects that automated systems may not be able to identify. Current manual inspection systems uses bright field illumination with no option of a Dark field illumination option. Though such methods are tedious and time consuming, the magnified images inspected by humans, can detect and classify certain types defects far better than automated systems especially if flipping of the lens is needed to inspect very fine defects. Moreover automated systems identify the defect and generally store the entire image of the lens and not just the area of interest. If a facility to store the defective images exists, the resolution of the area of the interest is usually the same as the entire contact lens image. It is an important aspect of any inspection system to perform detailed sample inspection of some contact lenses, as certain defects may require further analysis by using different calibrated reference templates. Some of the types of defects may require different types of reference templates to aid in specific measurements such as angular and distance from center of the lens. The different templates introduced at a position where images have very minimal aberration aids in accurate and reliable inspection. An apparatus and method to address this requirement in the industry is the basis of this invention.

It is generally accepted that manual inspection is required, especially where certain defects are not classified correctly or not detectable even with improved algorithms in automated inspection systems. Manual inspection systems will aid the programmers to classify or re-classify defects into their respect areas to constantly improve and achieve an optimum level of inspection quality in their automated systems.

A system and method that can magnify contact lenses and project the image on a big screen suitably integrated with two high resolution cameras, one for displaying the image on a computer and another camera mounted on a swivel arm to enable manual positioning of the camera at the area of interest of the magnified image, to enable capturing of full or partial images using a Dark field illumination and a Bright field illumination, and storing them under different classifications for further analysis Subsequently using the analyzed data may be used to identify the process or any other issues in manufacturing and taking corrective action to address them, is the objective of the present invention

SUMMARY OF INVENTION

A contact lens henceforth also referred to as CL, is a device used to mount on the eye to help correct vision related problems related to short sight, long sight and other focusing related issues within the eye.

During the manufacturing process the Contact lenses several defects occur which may be associated with the type of polymers used, thermal effects that the polymer may be subjected to, separation of contact lenses from the injection Mold, Printing on cosmetic lenses and so forth. Automatic inspection systems that are incorporated in-line with the manufacturing process are typically programmed to remove any defects identified which are subsequently placed in separate trays. Selected inspected lenses considered to be good are subsequently analyzed offline by technical or experienced operators who then tabulate their findings manually and results reported to the Process Engineers. Any defects identified will help the process engineers subsequently tweak the process parameters in the automated inspection system leading to further optimisation and enhancement in quality of the inspected lenses.

During the process of analysis, it is normal for operators who are manually inspecting the lenses to make mistakes, especially when using an optical comparator when identifying the area, position and type of defect leading to an improper conclusion. The defect identified using the current method is tedious and inconvenient, due to the nature of optical comparator characteristics. Accurate representation of the defect whether it is size, colour, position or type of defect is extremely important especially if the data is to be used for correcting the manufacturing process. Any errors in the data can lead to many iterations in the correction loop process which can be time consuming and error prone.

A contact lens defect analysis system and method, is provided in accordance with the present invention which comprises a lens image acquisition block comprising a high resolution camera, a front group lens arranged to capture the image of the curved lens through a beam splitter, and at least two sets of lighting modules designed using LEDs in the visible spectrum of light, to illuminate the lens under inspection, the first one being a Top light head module herein referred to as the Topside Light head, and at least a second illumination module herein referred to as the Backside Light head, comprising at least three lighting modules herein referred to as Dark Field Light head suitably arranged. The Dark field light head illuminates the bottom of the lens to produce a Dark field image of the lens, a second lighting module namely the Bright field light head illuminates the lens to produce a bright field image of the lens. The Contact lens defect analysis inspection system projects the magnified image of the contact lens overlaid with an image of calibrated measurement gauge, onto a big screen using a rear group lens for the human operator to view the defects clearly. A big screen is an important element of the apparatus that helps minimize stress on the eye of the operator. The operator after viewing the image on the big screen, and decides to capture the image subsequently, presses a key on the computer to capture the selected image using a first camera. A beam splitter splits the optical path into two, creating two aberration free images, one of which is captured by the first camera. The other aberration free image (main path) continues to propagate through the rear group lens to finally create a magnified image on the big screen and subsequently captured by the second camera. If the operator then decides that the defect viewed on the big screen needs to be further classified, the second camera provided is utilized to capture an image of the specific area around the defect. At the end of the procedure, the classification of the a defect is therefore more accurate, detailed and informative with lot traceability, Batch Code and Manufacturing date along with a host of other parameters such as Machine Number, Operator code etc.

It is an object of the present invention to provide an apparatus and method to easily view an image using rear projection instead of the current front projection image to visually detect defects and accurately measure the size, position and type of defect, on a magnified image of a contact lens superimposed with the image of a measurement gauge, projected on a viewing screen. Images viewed in the Front projection systems prevents operators to take a close look due to illumination obstruction unlike rear projection.

It is another object of the present invention to provide an apparatus and method to create a database of images of defects (using the image acquisition system suitably integrated to a first and second camera) wherein the image of the entire contact lens is captured by the first camera and specific areas of the defects is captured with a second camera. An aberration free image of the contact lens is captured at an intermediate stage by using a beam splitter. It is another object of the present invention to provide an apparatus and method for manually inspecting the contact lens suitably positioned on a cuvette with at least one dark field and at least one bright field illumination modules.

It is an object of the present invention to provide an apparatus and method for manually inspecting the contact lens using a second camera to capture a specific area of the image projected on the screen that enables a more detailed classification of defects. It is further an object of the present invention to provide an apparatus that is integrated with a transparent overlay that is used as a measurement gauge that may be interchanged for different product types to enable measurement geometrical properties of the contact lenses. 7

It is further an object of the present invention to provide an apparatus that incorporates a big viewing screen for the human operator to obtain a focused image of the contact lens using an XY and Z table. A focused image is essential for accurate measurements. It is further an object of the present invention to provide a big viewing screen suitably positioned for easy viewing, behind a second group lens.

Other features and objects of the present invention will become apparent from the detailed description of the preferred embodiment(s) as well as the drawings included herein below.

BRIEF DESCRIPTION OF DRAWINGS

It will be convenient to further describe the present invention with respect to the accompanying drawings that illustrates the arrangement of the invention. Person skilled in the art will appreciate that other arrangements of the invention are possible, and consequently the particularity of the accompanying drawings is not to be understood as superseding the generality of the preceding description of the invention.

FIG. 4 illustrates an image of a contact lens overlaid with the image of the measurement gauge.

DETAILED DESCRIPTION

Although the invention is applicable to various types of optically transmissive components, it will be described by way of example with respect to a contact lens.

Figure 1:
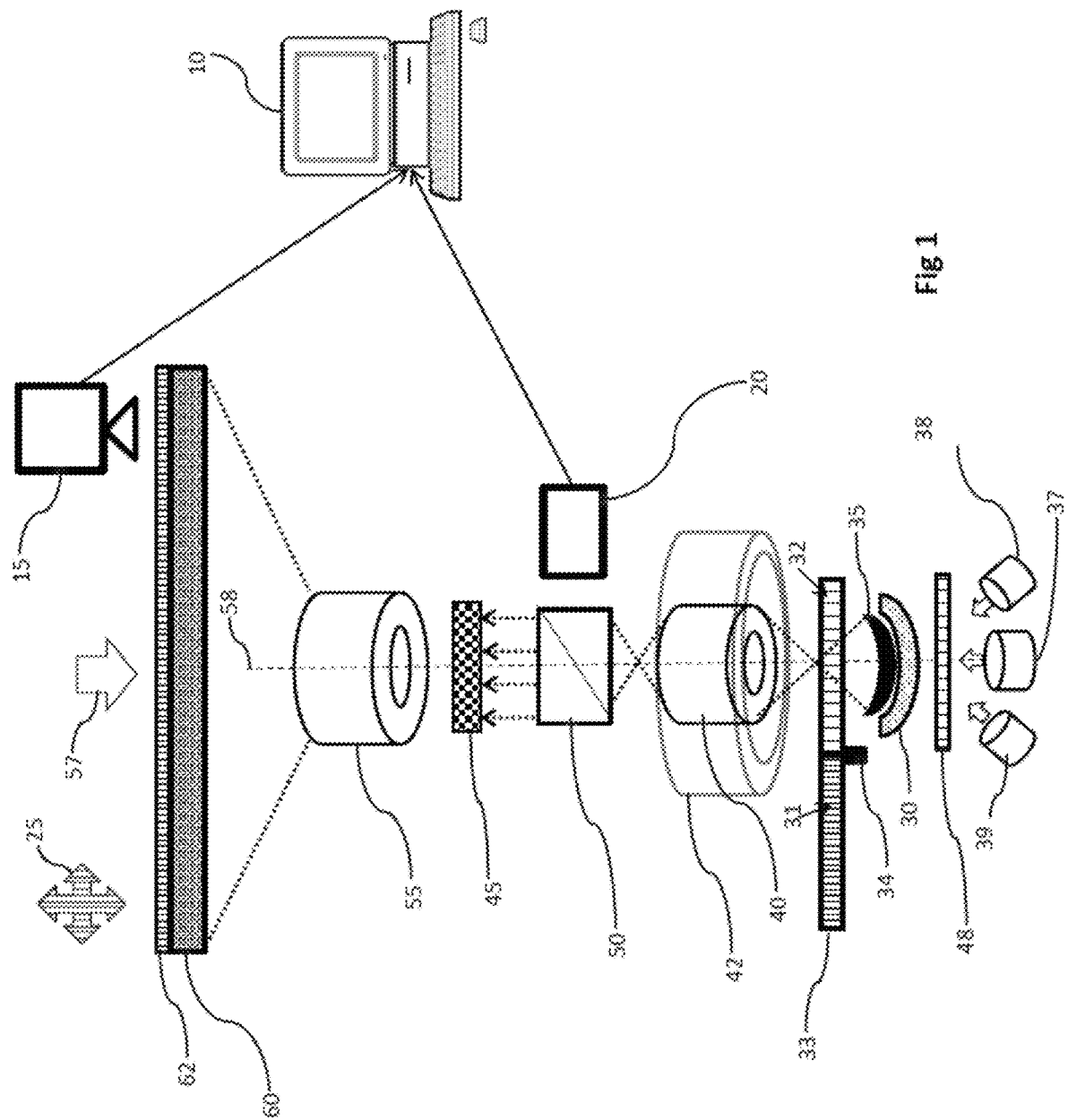
FIG. 1 is an illustration of the optical, illumination and imaging system according to the present invention.

Referring to FIG. 1, and in accordance with a constructed embodiment of the present invention, a system is illustrated that helps to analyze and identify defects, aberrations, contamination, deformation & geometrical properties, which includes at least one image acquisition module, an analog viewing screen, an optical module, multiple illumination modules including Top illumination, Bottom illumination (Bright field) and another Bottom illumination (Dark field), a pair of measurement gauges made of glass or transparent film and at least one more image acquisition module mounted on a flexible swivel stand.

The image acquisition module comprises two high resolution cameras 15 and 20 connected to a computer 10 for image capture and storage. The camera 20 is positioned at a fixed location while camera 15 is mounted on a swivel stand (not shown) which moves in different directions 25 to enable the operator to capture a specific area of interest of the image of the lens 35 shown on screen 60. Camera 20 is positioned to capture the intermediate image of the lens 35 through the beam splitter 50. A circular disk 33 with multiple optical filters arranged around the circular disk and mounted on a rotating mechanism 34 to enable the operator to use different filters to view different types of defects without changing any of the optical setup or configuration.

A pair of optical modules 40 and 55 are used to focus the image of the lens 35 positioned on a cuvette 30.

A pair of illumination modules 38,39 enables capturing a reverse contrast image (FIG. 3) useful for defect analysis and classification purpose and the top bright field illumination module 42 enables accurate print and colour inspection of cosmetic lenses.

A rotating wheel 33 mounted on 34, a rotating mechanism may be a manual or motorized system, serves to rotate multiple optical filters 31 and 32 in line with the optical axis 58. It is important to note that many more filters maybe be implemented in the wheel 33 or replaced with another wheel with a different set of optical filters depending upon the application. For illustration purpose, only two filters 31 and 32 have been shown.

An interchangeable measurement gauge also commonly referred to as a measurement template or gauge 45. The gauge 45 is placed at the intermediate image plane to produce an overlay image on the image of the lens 35 and projected on the screen 60 as well as to capture the intermediate image using camera 20 without the optical lens. The gauge 45 may be interchanged to suit the measurement requirements. Position 57 in FIG. 1 indicates the viewing direction by the quality control operator and FIG. 4 shows an example of the overlay image that the operator can view on the screen 60. 62 is another flexible template that maybe mounted to measure other defects in the image. The template 62 maybe a flexible film or a calibrated glass plate that is available commercially.

A diffuser 48 is positioned such that it can be swivelled in and out to enable diffusion of the bright field and dark field illumination for the contact lens 35.

Figure 2:
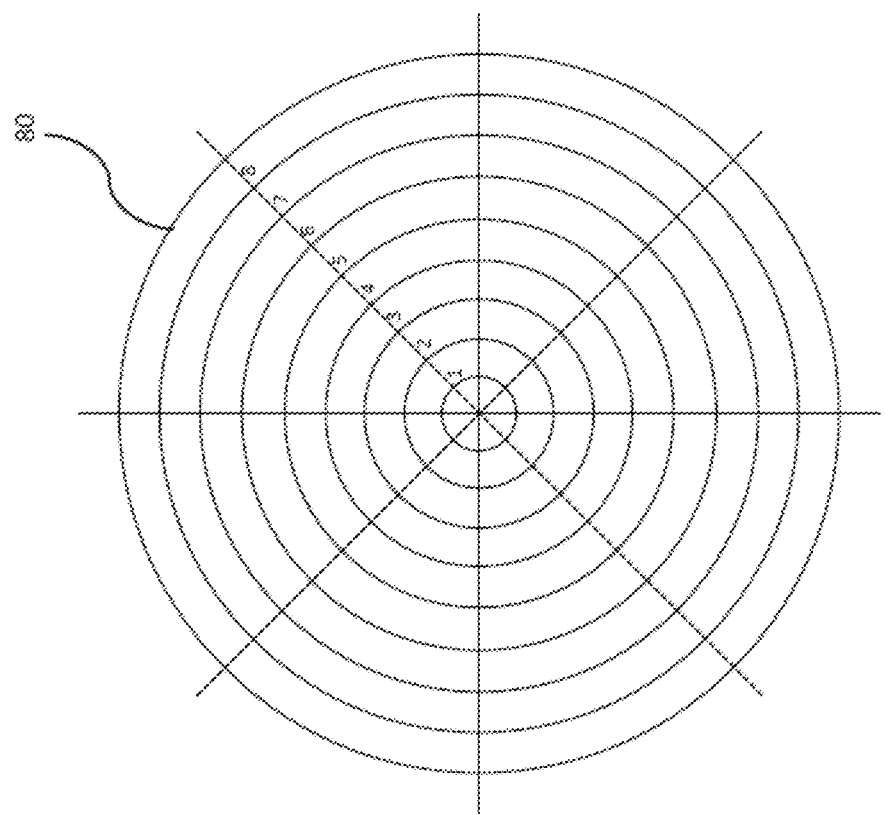
FIG. 2 illustrates a typical sample of a measurement gauge.

FIG. 2 represents a typical measurement gauge 45 in FIG. 1.

Figure 3:
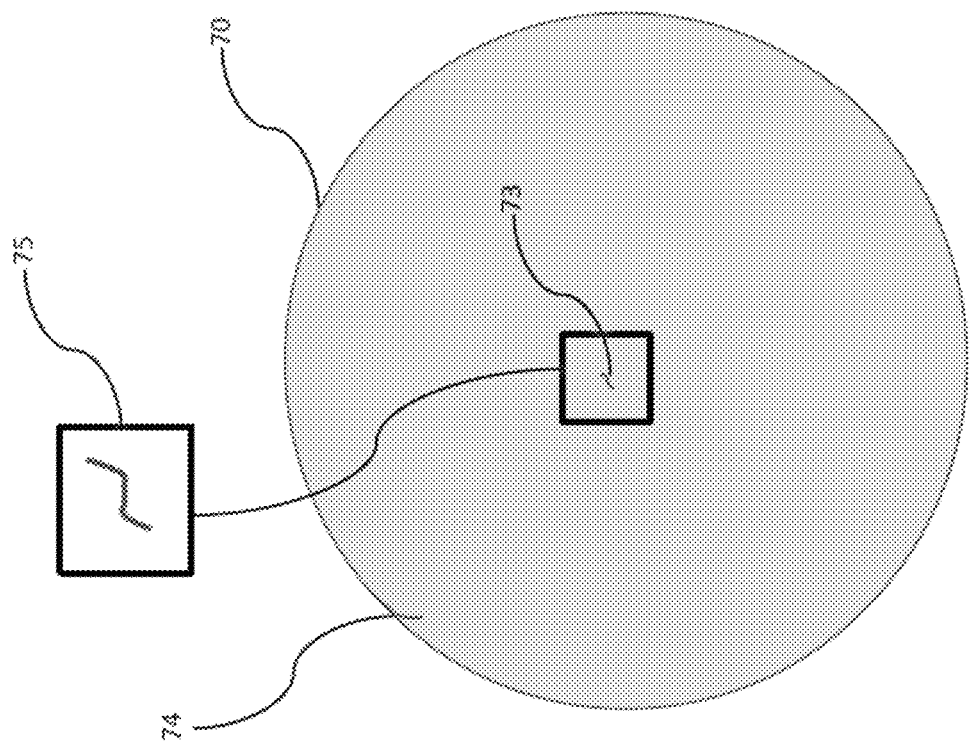
FIG. 3 is illustrates and image of a contact lens illuminated with the Bright Field illumination module.

Referring to FIG. 3, image 70 is an analog image of contact lens 35 with bright Field illumination module 37 turned ON. Defects 73 and 74 represents tears in the contact lens 35. The box 75 is an enlarged view of defect 73. The image 70 may also be captured by Camera 20 through beam splitter 50 for storage in a central server or computer 10.

FIG. 4 is an illustration of an overlay image of the contact lens 35 and image of the pattern of measurement gauge 45 as displayed on screen 60 of FIG. 1. It is important to note that the image illustrated in FIG. 4 is without the presence of measurement gauge 62. The defects 73 and 74 in FIG. 4 that is displayed on screen 60 of FIG. 1 may further be captured using camera 15 under different zoom levels, to be stored on the central server or computer 10 for further analysis or classification.

FIG. 4 is a superimposed image consisting of image 70 of contact lens 35 positioned on cuvette 30, with Bright Field illumination modules 37-39 turned ON, overlaid with the image of the measurement gauge 45 in FIG. 1.

The superimposed image 70 in FIG. 4 is a superimposed image of lens 35 and the measurement glass or film 45, which enables the operator to measure positional information such as size, colour, X & Y position of defects 73 and 74 and geometrical information such as diameter for the contact lens 35.

The measurement gauge 45 is one of the typical forms of commercially available gauges. Depending upon the type of measurements required, several other types of commercially available gauges maybe used such as the one shown in FIG. 5.

Figure 5:
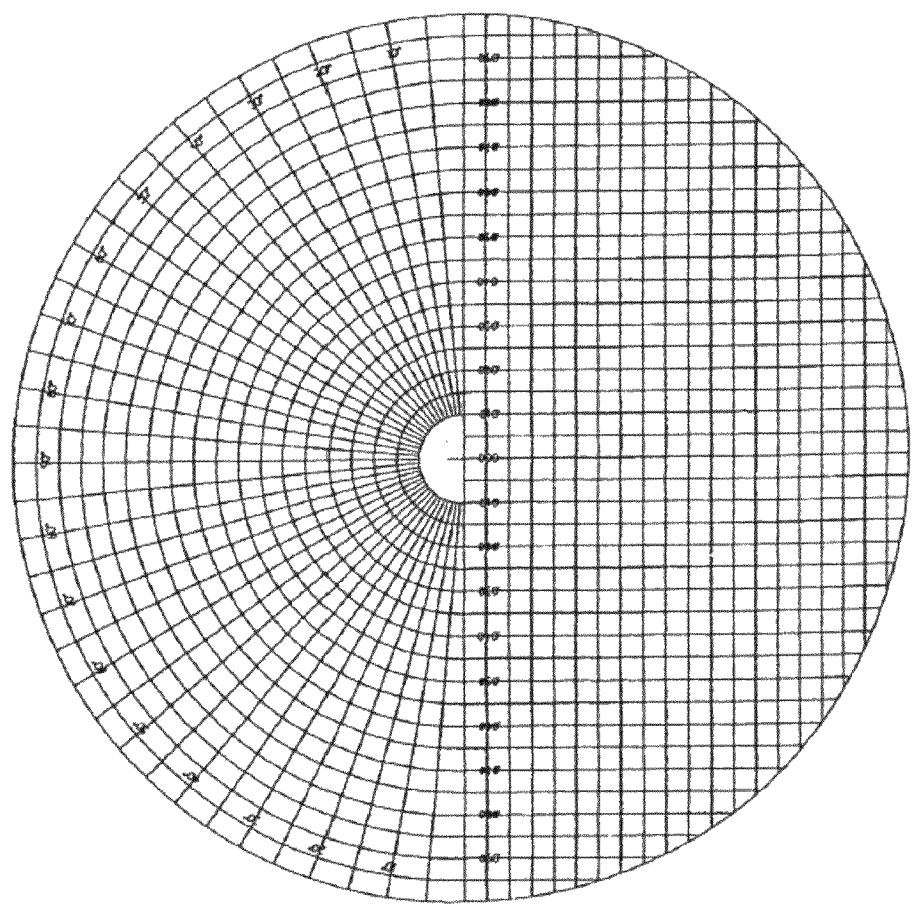
FIG. 5 illustrates a sample of a different model of measurement gauge.

FIG. 5 illustrates another model of the measurement gauge 90 which may be replaced with the gauge 45 in FIG. 1 to measure many other detailed defects for analysis and subsequently implement corrections to the manufacturing process.

Referring to FIG. 1, the measurement gauge 45 is a high precision gauge enabling very precise measurements of defects compared to the measurement gauge 62 which is placed in close proximity to the transparent projection screen 60 enabling gross measurements of defects in the contact lens 35. Depending upon the inspection requirement the operator may choose to either use gauge 45 or gauge 62. This arrangement enables the scalability of the apparatus to apply for a range of products other than contact lenses. Any transparent object that requires inspection such as glass lenses, plastic lenses, calibration gauges etc., can be efficiently and accurately inspected by the operator.

The database of images of defects along with their associated full resolution images enables operators to study, analyze and classify defects according to their types. The results may further be used for setting up inspection parameters or fine tuning them on automated machines to minimize escapes and overkill and subsequently to achieve optimum level of quality control.

While the invention has been described with reference to the various embodiments thereof, those skilled in the art will be able to make modifications to the described embodiments without departing from the true spirit and scope of the invention. For example, the illumination modules may be replaced with UV type illumination, Infrared LED lighting or Laser lighting that may enhance certain types of defects better than normal visible LED lighting.

The invention claimed is:

1. A defect analysis and tracing system for clear and cosmetic contact lenses using rear projection, comprising;
    a glass cuvette curved to hold a contact lens;
    a pair of illumination modules directed towards the cuvette for back and front Illumination;
    a diffuser mounted on a horizontal swivel arm to aid in diffusing the Backlit illumination when required;
    a rotary wheel mounted with at least two optical filters;
    a first optical module focussed at the contact lens for capturing an aberration free image;
    a beam splitter to split the beam of light for capturing the image by a computer at one stage and for projection of the image on to a viewing screen at the second stage;
    a first camera connected to a computer for image capturing at a first stage, and second camera at a second stage for capturing images from the viewing screen;
    a gauge holder for mounting a precision calibration made of glass for measurement of various dimensions and defects of the object under inspection;
    a second optical module mounted after the calibration gauge to project an overlaid image of the contact lens and the calibration pattern on the gauge, on to a viewing screening;
    a large viewing screen on which the image is projected for accurate measurement of various features of the contact lens.

2. A system of claim 1, further including a gauge holder that features an interchangeable mechanism to accommodate a variety of calibration gauges to inspect and measure different types of contact lenses.

3. A system of claim 1, further including a second camera mounted on a swivel arm, to manually position it in front of the viewing screen to capture magnified images of specific features on contact lenses.

4. A defect analysis and tracing method for clear and cosmetic contact lenses using rear projection, comprising the steps of;
    capturing an image of the contact lens under inspection with backlit and front lit illumination;
    pulsing one or more illumination modules dynamically at different time domains, to enhance defects such as bubbles, tears, scratches, pattern including lot information;
    processing the captured image from a first camera to identify the critical features and tagging them to the lot information for tracing purposes;
    determining the critical features and creating a database by mapping the defects to the lot information;

triggering a second camera to capture magnified images of critical defects determined when processing the images from the first camera, by manually positioning the second camera close to the identified defects on a viewing screen;

consolidating and tagging the magnified images to the specified lot and enhancing the database effectiveness with the list of critical defects along with their magnified areas; and communicating the tabulated results and the database to an external interface or printing them for use by the quality assurance team to tweak the manufacturing process.

5. A method of claim 4, wherein the measurements of features or defects includes changing of measurement gauge to suit the defect type.

6. A method of claim 4, wherein the measurements of features or defects includes capturing of images of defects under multiple magnification settings for specific defect type.

7. A method of claim 4, wherein the measurements of features or defects includes utilising different optical filters mounted on a Rotary wheel to enhance features on contact lenses.

* * * * *